E. FLICEK.
DRILL CHUCK.
APPLICATION FILED MAR. 10, 1919.
1,326,654.
Patented Dec. 30, 1919.
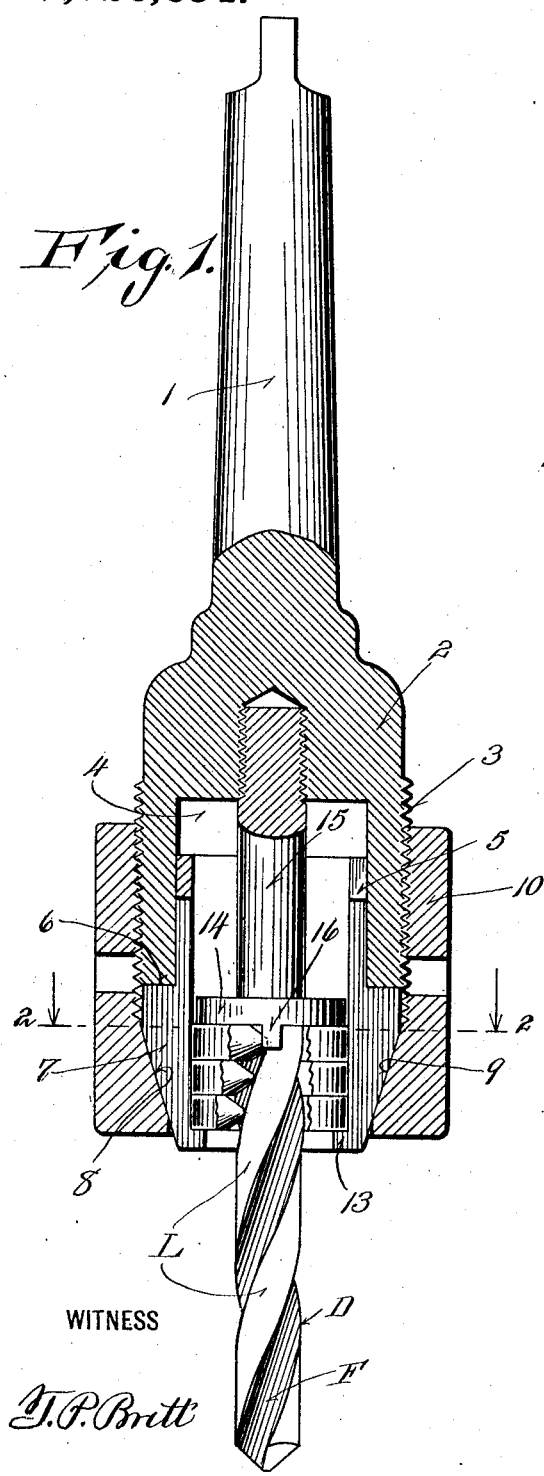
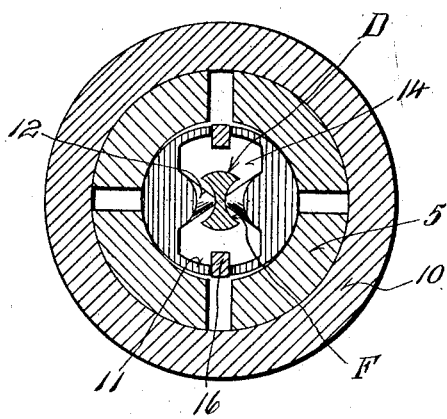
WITNESS
J. P. Britt
INVENTOR
Edward Flicek
BY
ATTORNEYS

UNITED STATES PATENT OFFICE.

EDWARD FLICEK, OF HARTFORD, WISCONSIN.

DRILL-CHUCK.

1,326,654.      Specification of Letters Patent.      Patented Dec. 30, 1919.

Application filed March 10, 1919. Serial No. 281,804.

*To all whom it may concern:*

Be it known that I, EDWARD FLICEK, a citizen of the United States, and resident of Hartford, in the county of Washington and State of Wisconsin, have invented certain new and useful Improvements in Drill-Chucks; and I do hereby declare that the following is a full, clear, and exact description thereof.

This invention relates to improvements in drill chucks for use in connection with drill presses, lathes and the like.

The average twist or machine drill is very apt, under certain conditions, to break in two, such breakage usually occurring adjacent to the attaching end of the shank so that the parts are therefore practically useless inasmuch as the standard drill chuck will not retain the active end in working position. In other words, the ordinary type of drill chuck will not hold a drill unless the same is provided with a specially designed shank. Obviously then drills which become broken are absolutely useless and must be discarded, thus involving a considerable loss as such drills are usually quite expensive.

It is therefore the principal object of this invention to provide a drill chuck of improved design which will readily receive and effectively grip a broken end or shankless portion of a twist or machine drill. The chuck is so constructed that it will automatically center and retain a portion of such a drill regardless of its length.

It is also an important object to provide means whereby the number or shape of the gripping elements may be varied depending upon the type or length of drill end to be held.

With these general objects in view the invention resides in novel arrangement of parts which will be hereinafter more particularly described and claimed and shown in the drawing.

Figure 1 represents a vertical, longitudinal, sectional view through a drill chuck constructed in accordance with the invention.

Fig. 2 is a horizontal section taken substantially on the plane of the line 2—2 of Fig. 1.

Referring to the drawings it will be noticed that this improved chuck includes the usual tapered retaining shank which is adapted to be inserted in the bore of the cooperating part of a drill press or lathe, and a socketed head 2, the same being screw threaded as at 3. Disposed in the socket 4 of said head 2 is a split sleeve 5, the intermediate portion of which is provided with an annular external shoulder 6 for engagement with the outer end of said head; the portion 7 of the sleeve 5 which projects outwardly of the end of the head 2, that is to say the part beyond the shoulder 6, is adapted to retain the clamp dogs which will be hereinafter more particularly described. This outer end portion 7 of the sleeve 5 is tapered as at 8 for coöperative engagement with the tapered portion 9 of a clamp nut 10, the inner end portion thereof being internally screw threaded for engagement with the screw threads 3 of the head. As is customary in devices of this character the portion 7 of the sleeve 5 will be forced inwardly when the nut is screwed onto the head 2.

The clamp dogs hereinbefore referred to, which are designated by the numeral 11, are substantially half rings as indicated in Fig. 2, and each of them includes an inwardly extending centrally positioned conical finger 12. These clamp dogs are arranged in pairs and are superimposed one pair upon the other as shown in Fig. 1, thus providing a plurality of gripping points whereby the drill may be effectively held. The conical fingers of each pair of dogs are designed to coöperate, and when in operative position the twist or machine drill D has these fingers disposed in the flutes F, or in other words, between the lands L. As each dog 11, as well as each pair, is independently movable it will be noticed that when the drill D is inserted into the end of the sleeve 5, said dogs will shift with respect to each other so that the fingers 12 will conform to the twist of the flutes.

Although in the present application I have shown three superimposed pairs of clamps dogs it is obvious that any number of pairs may be disposed within the sleeve 5. They are held in the last mentioned part by a radially extending flange 13 formed on said sleeve 5. For coaction with the flange 13 to prevent excessive movement of the parts of the clamp dogs and to retain them in the outer end portion of the chuck, a circular backing plate 14 is located within the sleeve 5 and is spaced outwardly of the bottom of the socket 4 by means of the stem 15 on which it is mounted. The inner end of said stem is screw threaded and engaged in the threaded socket in the bottom of the socket 4 whereby by rotation of the plate 14 in the proper direction the same may be moved inwardly or outwardly with respect to the end of the sleeve 5, thus permitting the number of pairs of dogs to be changed.

A further purpose of the plate 14 is to seat the end of the broken portion D of the drill which has preferably been squared off. Projecting outwardly from this plate is a pair of spaced lugs 16 which are designed to be located between the adjacent ends of the inner pair of dogs 11 (see Fig. 2) to prevent rotation thereof and to consequently hold the drill end D stationary with respect to the other parts of the chuck.

From the foregoing description taken in connection with the accompanying drawing it will be evident that a very improved form of chuck has been produced which will effectively hold a twist or machine drill end which has been broken from its shank to thereby permit continued use of the damaged tool. Various minor changes may be made in the form and proportion and in the number of parts of the device without departing from or sacrificing any of the features of the invention, the embodiment illustrated being merely one exemplification of my improved drill chuck.

I claim:

1. In a chuck of the class described, a socket member, a backing plate in the socket thereof adapted to have the inner end of a drill abut thereagainst, a plurality of pairs of spaced chuck dogs, each pair being movable independently of the other, an inwardly extending finger on each of said dogs to engage within the flute of a drill, means for urging the dogs of each pair toward each other to clamp a drill between said fingers, and a lug extending from said backing plate to engage between the adjacent pair of dogs to hold the same against rotation.

2. In a chuck of the class described, a plurality of axially superimposed pairs of chuck dogs, one dog of each pair being movable independently of the corresponding dogs of the other pairs, an inwardly extending finger on each of said dogs to engage in the flute of a drill, and means for urging the dogs of each pair toward each other to clamp a drill between said fingers.

3. In a chuck of the class described, a plurality of axially superimposed pairs of chuck dogs, each of the dogs being movable independently of the others, an inwardly extending finger on each dog to engage within the flute of a drill, and means for urging said dogs toward each other to clamp a drill between said fingers.

4. In a chuck of the class described, a socket member, a sleeve disposed in the socket thereof, an inwardly extending annular flange on the outer end of said sleeve, a pair of chuck dogs seated on said flange within said sleeve, an adjustable backing plate in the socket and spaced inwardly of the flange a distance substantially equal to the thickness of said dogs, and means coöperating with said sleeve for urging said dogs toward each other.

5. In a chuck of the class described, a socket member, a sleeve disposed in the socket thereof, an inwardly extending annular flange on the outer end of said sleeve, a plurality of pairs of chuck dogs disposed in said sleeve and superimposed on said flange, a backing plate in the socket and spaced inwardly of the flange a distance substantially equal to the thickness of the pairs of dogs, a stop lug on the backing plate to project between the innermost pairs of dogs, and means coöperating with said sleeve for urging the dogs of each pair toward each other.

6. In a chuck of the class described, a plurality of axially superimposed chuck dogs, either of the dogs being movable independently of the other, said dogs being engageable with one side portion of a drill or the like, coöperating clamping means engageable with the opposite side portion of the drill or the like, and means for urging the dogs toward the clamping means to grip a drill or the like therebetween.

7. In a chuck of the class described, a plurality of axially superimposed pairs of chuck dogs, each of the dogs being movable independently of the others, the corresponding dogs of the several pairs being adapted to be disposed in engagement with the opposite side portions of a drill or the like, and means for urging the dogs of each pair toward each other to clamp said drill.

8. In a chuck of the class described, a socket member, a backing plate located in the socket thereof and adapted to have the inner end of a drill or the like abut thereagainst, said plate being axially adjustable inwardly or outwardly within the socket, a plurality of pairs of chuck dogs, the corresponding dogs of each pair being adapted to engage the opposite side portions of said drill or the like, means for moving the dogs of each pair toward each other to grip said drill or the like, and a lug extending from said backing plate to engage between the innermost pair of dogs.

In testimony that I claim the foregoing I have hereunto set my hand at Hartford, in the county of Washington and State of Wisconsin.

EDWARD FLICEK.